United States Patent [19]

Knebl et al.

[11] Patent Number: 4,601,907

[45] Date of Patent: Jul. 22, 1986

[54] CHEWY CONFECTION

[75] Inventors: Leslie F. Knebl; Ramola Lewis, both of Toronto, Canada

[73] Assignee: Warner-Lambert Company, Morris Plains, N.J.

[21] Appl. No.: 730,225

[22] Filed: May 3, 1985

[51] Int. Cl.$^4$ .............................................. A23G 3/30
[52] U.S. Cl. ...................................... 426/5; 426/660; 426/572
[58] Field of Search .................... 426/5, 660, 572, 568, 426/564

[56] References Cited

U.S. PATENT DOCUMENTS

| | | | |
|---|---|---|---|
| 2,973,273 | 2/1961 | Curtiss | 426/5 |
| 3,020,164 | 2/1962 | Forkner | 426/5 |
| 3,912,817 | 10/1975 | Sapsowitz | 426/5 |
| 4,120,987 | 10/1978 | Moore | 426/660 |
| 4,352,823 | 10/1982 | Cherukuri et al. | 426/5 |
| 4,352,824 | 10/1982 | Puglia | 426/5 |
| 4,352,825 | 10/1982 | Cherukuri et al. | 426/5 |
| 4,399,154 | 8/1983 | Puglia et al. | 426/5 |
| 4,410,552 | 10/1983 | Gaffney et al. | 426/572 |
| 4,466,983 | 8/1984 | Cifrese et al. | 426/660 |
| 4,491,596 | 1/1985 | Elias | 426/5 |

Primary Examiner—Jeanette Hunter
Attorney, Agent, or Firm—Howard Olevsky; Gary M. Nath

[57] ABSTRACT

A chewy confection having an outer casing comprising chewing gum base and a sweetener, and a center filling which is an aerated plastic blend containing about 5% to about 20% moisture, and from about 1% to about 15% fat with m.p. above 22° C. and about 0.1% to about 10% whipping agent dispersed in a water-soluble, sweet-tasting chewy candy matrix which forms about 55% to about 90% of the blend. The center filling has a chewing consistency similar to that of the casing so that at first bite through the confection the center filling is not readily distinguishable. The center filling imparts prolonged release of sweetness and of flavor (when present in the center filling) and an improved size perception as compared with chewing gum items of similar size.

25 Claims, No Drawings

CHEWY CONFECTION

The invention relates to a chewy confection item having a chewing consistency similar to that of chewing gum and providing a novel chewing texture, an effect of improved perception of the size of the item in the mouth of the consumer as compared with conventional chewing gum items of similar size, and a prolonged release of flavour or sweetness on chewing.

The invention provides a chewy confection having an outer casing of chewing gum comprising gum base and sweetener, and a centre filling having a chewy consistency approximating that of the chewing gum outer casing, comprising an aerated, plastic blend having a moisture content of about 5% to about 20% by weight and comprising from about 1% to about 15% by weight fat with a melting point about 22° C. and about 0.1% to about 10% by weight of a whipping agent dispersed in a water-soluble, sweet-tasting, chewy candy matrix constituting about 55% to about 90% by weight of said blend.

The aerated plastic blend of the centre filling may have the characteristics of nougat, marshmallow, toffee or other type of chewy candy. At first bite, its consistency is similar to that of the chewing gum casing and the consumer does not readily perceive the presence of the candy portion, although the texture and mouth feel of the chewed item combines features typical of both candies and chewing gums. With continued chewing, as the water soluble candy portion dissolves in the mouth, the texture and mouth feel of the chewing gum portion become more pronounced. The aeration of the centre filling, together with its fat content, assist in rendering the consistency of the centre filling similar to that of the chewing gum outer casing. Unexpectedly, and for reasons that are not presently fully understood, but are perhaps related to the aerated texture of the centre filling, the item achieves in the mouth of the consumer a perception of somewhat increased size as compared with conventional chewing gum items of similar size. Further, on initially chewing the item, there is no immediate impression of the sweetness of the centre filling or of its flavour (as distinct from sweetness) in the case in which the centre filling includes a flavour. The sweetness and flavour, if any, tend to develop with chewing, and tend to be prolonged as compared with conventional chewing gums containing similar concentrations of sweetener or flavour.

Water-soluble, sweet-tasting and chewy candies such as form the matrix in the centre filling in the present confection are in themselves well known. Usually, these comprise a supersaturated solution of one or more solid sweeteners (usually a sugar and, more typically, sucrose) containing a non-crystallizable liquid sweetener (also usually a sugar such as fructose syrup, invert sugar, high fructose corn syrups, starch hydrolysates, and, more typically, glucose syrup, or mixtures of two or more of these), obtained by cooking a solution of the solid and liquid sweeteners to a desired solids content which depends on the consistency desired for the product, the higher the solids content, the harder the candy. The liquid sweetener interferes with and retards any tendency for the solid sweetener to re-crystallize on cooling of the product, usually for a period extending well beyond the normal shelf life of the product. By reason of the wide availability of sucrose, its low cost, and its ready acceptance in confectionery items, a sucrose-based chewy candy is preferred for use in the centre filling in the chewy confection of the invention. As will be readily appreciated, however, other chewy candy compositions of physical and organoleptic properties similar to those of sucrose-based candies may be employed.

As noted above, the centre filling should have approximately the same chewy consistency as the outer chewing gum casing, so that at least on first bite through the confection, the consumer does not perceive an abrupt change of hardness or softness at the interface between the casing and the filling. The consistency of the centre filling may be varied by varying the consistency of the candy matrix, the degree of aeration of the filling, the content and nature of the fat present in the filling, and the moisture content of the filling. The consistency of the candy matrix employed in the filling may in turn be varied by varying the weight ratio of solid to liquid sweetener present in the candy. Desirably this is about 0.75:1 to about 7:1 based on the solids content of the liquid sweetener. At ratios much below this range, the candy may tend to be excessively sticky in texture due to the presence of excess liquid sweetener or may tend to develop excessive stickiness on storage owing to the humectant properties of the usual liquid sweeteners. At higher ratios, the candy may tend to have an unduly hard consistency. More preferably said ratio of solid to liquid sweetener is about 0.9:1 to about 4:1. In the case in which the candy matrix is constituted by a cooked mixed solution of a liquid sweetener and sucrose as the solid sweetener, the consistency of the candy also depends on the solids content to which the mixture is cooked. Preferably, in order to assist in achieving a chewy candy consistency well adapted to match the chewy consistency of the outer gum casing, the mixture is cooked to a solids content of about 93% to about 97% by weight.

The aeration of the centre filling assists in imparting to the centre filling a chewy consistency approximating that of the outer chewing gum casing. Typically, the centre filling will be aerated to an extent that its density is about 75% to about 95% of its non-aerated density. More preferably, the aerated density will be about 80% to about 90% of the non-aerated density. The aerated filling may be achieved by, for example, forming a foam of an aqueous solution of the whipping agent and blending into this foam the chewy candy matrix material in a liquid, for example, melted condition, and permitting the resulting aerated mass to harden, e.g. by permitting it to cool. Another example of an aeration procedure is to form a plastic mass formed from a mixture of the candy matrix material in a plastic state and an aqueous solution of the whipping agent, and to stretch and fold the plastic mass, preferably using a conventional form of candy stretching and folding apparatus. The whipping agent serves to assist in the aerating of the centre filling, and assists in maintaining the aerated condition of the product during subsequent processing steps and in storage. To be effective for these purposes, the content of whipping agent should be not less than about 0.1% by weight of centre filling. The whipping agent materials tend to have a somewhat bland taste, and use of amounts of whipping agents of more than about 10% by weight, based on the total weight of the centre filling is generally unnecessary, and may tend to impart an undesirably gelatinous texture or bland taste to the centre filling. More preferably, the content of whipping agent is about 0.5% to about 5% by weight based on the total weight of the filling. Examples of suitable whipping agents include egg albumin, gelatine, cereal protein isolate, agar agar, pectin, and mixtures thereof. Certain of these materials, notably gelatine, agar agar and pectin are gelling agents which tend to bind water to them, and thus tend to maintain and stabilize a desired moisture content in the centre filling material during processing and storage.

As noted above, the consistency of the centre filling is in part dependent on the moisture content. Filling materials with moisture contents less than about 5% will tend to present a consistency which is unduly hard, and would tend to produce an undesirably perceptible difference in hardness between the centre filling and the outer casing. Moisture contents in excess of about 20% by weight based on the weight of the centre filling tend to result in the centre filling being too soft and having an undesirably sticky character. More preferably, the total moisture content of the centre filling, including any moisture present in the liquid sweetener component of the chewy candy matrix, is about 7% to about 15% by weight of the centre filling.

The presence of fat in the centre filling material contributes to a desired soft chewy consistency of the centre filling material, assists in maintaining the aerated condition of the centre filling, and also tends to reduce or eliminate sticking of the centre filling material to the teeth of the consumer. The melting point of the fat should be above normal ambient temperatures, to avoid any tendency for the fat component to melt during storage, resulting in product collapse. Thus, the melting point of the fat should be above 22° C., and more typically will be in the range about 32° C. to about 40° C. Product destined for warm climates will preferably employ fats having a melting point adjacent the higher end of this range, while product intended for distribution in temperate climates will usually employ a fat melting in the range about 32° C. to about 36° C. The fat tends to soften in the mouth with continued chewing, thus tending to result in a progressive softening of the centre filling with chewing. As the chewing gum outer casing also tends to soften at least during an initial chewing period, the presence of the fat also tends to maintain the chewing consistency of the centre filling similar to that of the outer casing material during chewing, so that discrepancies between the chewed centre filling portions and outer casing portions do not tend to become perceptible in the mouth of the consumer. The content of fat in the centre filling in order to achieve the desired textural effect should be at least about 1% by weight based on the total weight of the centre filling, and not more than about 15% by weight as at contents of fat much above this, the centre filling tends to have an undesirably greasy mouth feel. Preferably, the fat content is about 3% to about 7% by weight. It is preferred to employ as the fat an hydrogenated vegetable oil, cocoa butter or a mixture thereof, because of the ready availability of these materials, their desirable organoleptic properties, and their ready acceptance in confection items.

In order to assist in dispersing the fat material through the chewy candy matrix an emulsifier is desirably employed, generally in an amount of up to about 1.5% by weight of the centre filling, and more preferably up to about 0.8% by weight. As will be readily appreciated, the emulsifier, as with all the other ingredients present in the chewing confection should be of a food grade acceptable for use in an edible confection product. Preferred examples of desirable and effective emulsifiers include lecithin, glycerin stearates and mixtures thereof.

The aerated centre filling, as well as the chewing gum outer casing, desirably include small quantities of flavours, e.g. fruit flavours such as cherry, strawberry, banana, spice flavours such as cinnamon, or mint flavours such as peppermint or spearmint. The centre filling and outer casing may be of similar or different flavours. The chewing gum outer casing and centre filling may also include small quantities of colour. Again, the casing and filling may be of similar or different colours. The quantities of flavours and colours employed will typically be up to about 0.2% by weight of the centre filling and of the outer casing, respectively.

The quantity of the aerated centre filling present in the confection item should be sufficient to impart to the item to a perceptible degree the textural characteristics of the centre filling which become apparent on continued chewing of the item and also to impart to it the improved size perception in the mouth of the consumer which appears to result from the aerated texture of the centre filling. Preferably, the centre filling will constitute about 5% to about 70% of the item by weight, more preferably from about 15% to about 50% of the item by weight.

The outer chewing gum casing may be formed from a conventional chewing gum composition prepared, for example, by blending together a commercially-available chewing gum base, sweetener, such as a mixture of solid and liquid sweetener, flavour, and colour. The chewing gum composition may be formulated to provide or achieve a chewing consistency of any of the conventional chewing gum compositions. Preferred chewing gum compositions for the outer casing comprise gum base in an amount of about 10% to about 40% by weight, more preferably about 12% to about 35% and a mixture of solid and liquid sweetener in an amount of about 60% to about 90% by weight, more preferably about 65% to about 88% by weight (based on the solids content of the liquid sweetener together with the weight of solid sweetener).

The chewy confection of the invention may be manufactured on conventional candy forming apparatus employed for forming conventional centre filled candies, as, for example, on co-extrusion apparatus wherein the plastic chewing gum outer casing is extruded continuously around a co-extruded continuous length of the plastic blend of the aerated centre filling composition. The continuous product may then be cut transversely into pieces the size of conventional candy or chewing gum items, or the coextruded continuous product may be fed to a conventional candy-forming machine for forming into discrete pieces of conventional size. The exterior of the outer chewing gum casing of the product may be coated with a conventional chewing gum coating solution, e.g. an aqueous solution of liquid and solid sweeteners, starch and gum arabic, before or after the continuous length of the product is formed or cut into pieces, to eliminate or reduce any tendency for the pieces of the product to stick to one another, or to papers in which the product may be wrapped, and to eliminate or reduce any tendency for the product to become tacky and stick to the fingers of consumers.

EXAMPLES Some non-limiting examples of methods of preparation of chewy confection items in accordance with the invention will now be given.

Preparation of a chewing gum outer casing material.

| Ingredients | Parts by Weight |
| --- | --- |
| Gum base | 20 |
| Sucrose | 60 |
| Liquid glucose (80% solids) | 20 |
| Flavour | 0.08 |
| Colour | 0.02 |

The gum base was melted and placed in a standard dough mixer. The liquid glucose was added and mixed for 3-4 minutes. The sucrose, colour and flavour were added and mixed for 4-5 minutes.

The preparation of chewy aerated centre fillings is described in the following examples:

EXAMPLE 1

| Ingredients | Parts by weight |
| --- | --- |
| Egg albumen | 1.5 |
| Sucrose | 43 |
| Liquid glucose (80% solids) | 50 |
| Hydrogenated vegetable oil | 5 |
| Glycerin monostearate | 0.4 |
| Flavour | 0.1 |

The egg albumen was dissolved in 1.5 parts by weight of water and with 70% of the liquid glucose was whipped to a foam. The sucrose was dissolved in water, with the remainder of the liquid glucose, and was cooked to a final soluble solids content of 96%. This cooked syrup was incorporated into the whipped foam and the molten hydrogenated vegetable oil and glycerin monostearate and flavour were mixed in. The mass was cooled to 45° C.±5° C. The above chewing gum casing material was co-extruded with the plastic aerated centre filling material and the co-extruded rope thus formed was passed through a standard candy-forming machine to form it into confectionery pieces. On cooling to room temperature, the centre filling material had a chewy consistency closely similar to that of the chewing gum casing material at the same temperature.

EXAMPLE 2

| Ingredients | Parts by weight |
| --- | --- |
| Sucrose | 50 |
| Liquid glucose (80% solids) | 45 |
| Hydrogenated vegetable oil | 4 |
| Lecithin | 0.1 |
| Gelatine (200 Bloom) | 1 |
| Flavour | 0.1 |

The sucrose was dissolved in water and was cooked with the liquid glucose, hydrogenated vegetable oil and lecithin to a final concentration of soluble solids of 94%. The gelatine dissolved in 5 times its weight of hot water was then blended into the cooked mixture. This mass was cooled to 65° C.±5° C. after the flavour was added. The tempered plastic mass was aerated by means of stretching and folding for 3 to 5 minutes on a conventional candy stretching and folding machine.

The above chewing gum casing material was co-extruded with the centre filling material and the co-extruded rope was passed through a standard forming machine to form it into confection pieces.

On cooling, the centre filling material of Example 2 had a chewy consistency closely similar to that of the chewing gum casing material at the same temperature.

The embodiments of the invention in which an exclusive property or privilege is claimed are defined as follows:

1. A chewy confection with a chewing gum outer casing and a center filling having a chewy consistency similar to that of the outer casing said filling comprising an aerated plastic blend of:
   (a) about 55% to about 90% by weight of a water-soluble, sweet-tasting chewy candy matrix having dispersed therein;
      (1) about 5% to about 20% by weight of fat with a melting point above 22° C.; and
      (2) about 0.1% to about 10% by weight of a whipping agent, said plastic blend having a moisture content of about 5% to 20% by weight and obtaining its gum like chewing characteristics without gum base.

2. Confection as claimed in claim 1 wherein said moisture content is about 7% to about 15% by weight of the centre filling.

3. Confection as claimed in claim 1 wherein the centre filling comprises about 3% to about 7% of fat by weight.

4. Confection as claimed in claim 1 or 3 wherein said fat is hydrogenated vegetable oil, cocoa butter or a mixture thereof.

5. Confection as claimed in claim 1 or 3 wherein said fat has a melting point in the range about 32° C. to about 40° C.

6. Confection as claimed in claim 1 herein the centre filling comprises about 0.5% to 5% by weight of the whipping agent.

7. Confection as claimed in claim 1 or 6 wherein the whippping agent comprises egg albumen, gelatine, cereal protein isolate, agar agar, pectin or a mixture thereof.

8. Confection as claimed in claim 1 or 6 wherein the whipping agent comprises a gelling agent.

9. Confection as claimed in claim 1 or 6 wherein the whipping agent comprises gelatine, agar agar, pectin or a mixture thereof.

10. Confection as claimed in claim 1 wherein the centre filling comprises an emulsifier in an amount of up to about 1.5% by weight of the centre filling.

11. Confection as claimed in claim 10 wherein said content of emulsifier is up to about 0.8%.

12. Confection as claimed in claim 10 or 11 wherein the emulsifier is lecithin, a glycerin stearate or a mixture thereof.

13. Confection as claimed in claim 1 wherein the chewy candy matrix comprises solid and liquid sweetener in a weight ratio of about 0.75:1 to about 7:1 based on the solids content of the liquid sweetener.

14. Confection as claimed in claim 13 wherein said ratio is about 0.9:1 to about 4:1.

15. Confection as claimed in claim 1 wherein the chewy candy matrix comprises a cooked mixed solution of sucrose and a non-crystallizable liquid sweetener in a weight ratio of about 0.75:1 to about 1.75:1 based on the solids content of the non-crystallizable sugar.

16. Confection as claimed in claim 15 wherein said ratio is about 0.9:1 to about 1.5:1.

17. Confection as claimed in claim 13 or 15 wherein said liquid sweetener is fructose syrup, invert sugar, high fructose corn syrup, a starch hydrolysate, glucose syrup or a mixture thereof.

18. Confection as claimed in claim 13 or 15 wherein the liquid sweetener is glucose syrup.

19. Confection as claimed in claim 15 or 16 wherein the mixture is cooked to a solids content of about 93% to 97% by weight.

20. Confection as claimed in claim 1 wherein the centre filling is aerated to an extent that its density is about 75% to about 95% of its non-aerated density.

21. Confection as claimed in claim 20 wherein said density is about 80% to about 90%.

22. Confection as claimed in claim 1 wherein the outer casing comprises gum base in an amount of about 10% to about 40% by weight and a mixture of solid and liquid sweetener in an amount of about 60% to about 90% by weight (based on the solids content of the liquid sweetener together with the weight of the solid sweetener).

23. Confection as claimed in claim 22 wherein the content of gum base is in the range about 12% to 35% and said content of solid and liquid sweetener about 65% to about 88%.

24. Confection as claimed in claim 1 wherein the weight of the centre filling constitutes about 5% to about 70% of the weight of the confection.

25. Confection as claimed in claim 24 wherein said weight of the centre filling is about 15% to about 50%.

* * * * *